US012574602B2

(12) United States Patent
Yuan et al.

(10) Patent No.: US 12,574,602 B2
(45) Date of Patent: Mar. 10, 2026

(54) CONTROL DISPLAY METHOD, ELECTRONIC DEVICE, AND NON-TRANSITORY COMPUTER-READABLE STORAGE MEDIUM

(71) Applicant: Beijing Zitiao Network Technology Co., Ltd., Beijing (CN)

(72) Inventors: Fengbo Yuan, Beijing (CN); Hui Sun, Beijing (CN); Wentao Ruan, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/091,844

(22) Filed: Dec. 30, 2022

(65) Prior Publication Data

US 2023/0136808 A1 May 4, 2023

Related U.S. Application Data

(63) Continuation of application No. PCT/CN2022/086240, filed on Apr. 12, 2022.

(30) Foreign Application Priority Data

Apr. 16, 2021 (CN) .......................... 202110413121.9

(51) Int. Cl.
*H04N 21/472* (2011.01)
*G06F 3/04847* (2022.01)

(52) U.S. Cl.
CPC ... *H04N 21/47217* (2013.01); *G06F 3/04847* (2013.01)

(58) Field of Classification Search
CPC ....... H04N 21/47217; H04N 21/41407; H04N 21/4314; G06F 3/04847; G06F 3/0483;
(Continued)

(56) References Cited

U.S. PATENT DOCUMENTS

2011/0161875 A1* 6/2011 Kankainen ............ G06F 3/0481
715/810
2012/0236037 A1* 9/2012 Lessing ................. G06F 3/0485
345/661
(Continued)

FOREIGN PATENT DOCUMENTS

CN 106909282 A 6/2017
CN 107145272 A 9/2017
(Continued)

OTHER PUBLICATIONS

Office Action in CN202110413121.9, mailed Feb. 16, 2022, 18 pages.

(Continued)

*Primary Examiner* — John T Repsher, III
(74) *Attorney, Agent, or Firm* — Astute IP Law Group

(57) ABSTRACT

Provided are a control display method, an electronic device, and a non-transitory computer-readable storage medium. The method includes: displaying a video play page, where a target video scene of a currently played video and at least one control area of the currently played video are displayed in the video play page, and the at least one control area is located in an upper layer of the target video scene and configured to display at least one interaction control of the currently played video; receiving a target slide operation acting on the video play page; and in response to the target slide operation, controlling the target video scene to move along a sliding direction of the target slide operation and adjusting a degree to which the at least one interaction control blocks the target video scene.

20 Claims, 4 Drawing Sheets

(58) Field of Classification Search
CPC ......... G06F 2203/04804; G06F 3/0482; G06F
3/0485; G06F 3/04883; G06F 3/0488;
G06F 3/0484
See application file for complete search history.

(56) References Cited

U.S. PATENT DOCUMENTS

| | | | |
|---|---|---|---|
| 2015/0189215 A1* | 7/2015 | Kameoka | G06F 3/0482 |
| | | | 348/569 |
| 2015/0346976 A1* | 12/2015 | Karunamuni | G06F 3/04842 |
| | | | 715/765 |
| 2017/0192642 A1* | 7/2017 | Fishman | G06F 3/0488 |
| 2018/0248991 A1 | 8/2018 | Ryu et al. | |
| 2018/0329550 A1* | 11/2018 | Dellinger | G06F 3/016 |
| 2018/0343294 A1* | 11/2018 | Rands | H04N 21/4788 |
| 2019/0018555 A1* | 1/2019 | Jing | G06F 3/0486 |
| 2019/0099665 A1 | 4/2019 | Miao | |
| 2019/0138200 A1 | 5/2019 | Zhang | |
| 2020/0272245 A1* | 8/2020 | Wang | G06F 3/0362 |
| 2020/0326848 A1* | 10/2020 | Amini | G06F 3/0416 |
| 2021/0286510 A1* | 9/2021 | Tyler | G06F 3/0484 |

FOREIGN PATENT DOCUMENTS

| | | | |
|---|---|---|---|
| CN | 108182019 A | 6/2018 | |
| CN | 108762619 A | 11/2018 | |
| CN | 109471571 A | 3/2019 | |
| CN | 109508128 A | 3/2019 | |
| CN | 109529319 A | 3/2019 | |
| CN | 109618210 A | 4/2019 | |
| CN | 110958481 A | 4/2020 | |
| CN | 111294637 A | 6/2020 | |
| CN | 111488096 A | 8/2020 | |
| CN | 112423086 A | 2/2021 | |
| CN | 113110783 A | 7/2021 | |
| EP | 4090035 A1 | 11/2022 | |
| JP | 2017-228928 A | 12/2017 | |
| WO | 2022/100508 A1 | 5/2022 | |

OTHER PUBLICATIONS

International Search Report issued in International Patent Application No. PCT/CN2022/086240 on Jun. 24, 2022.
Extended European Search Report and Search Opinion for European Application No. 22787508.5, mailed Jul. 18, 2024, 4 pages.
Office Action for European Patent Application No. 22787508.5, mailed Jul. 30, 2024, 8 pages.
Office Action for Japanese Patent Application No. 2023-563315, mailed May 21, 2024, 6 pages.
Written Opinion for International Application No. PCT/CN2022/086240, mailed on Jun. 24, 2022, 9 Pages.
Examination Report for Australian Patent Application No. 2022258350, mailed on Oct. 3, 2024, 3 pages.

* cited by examiner

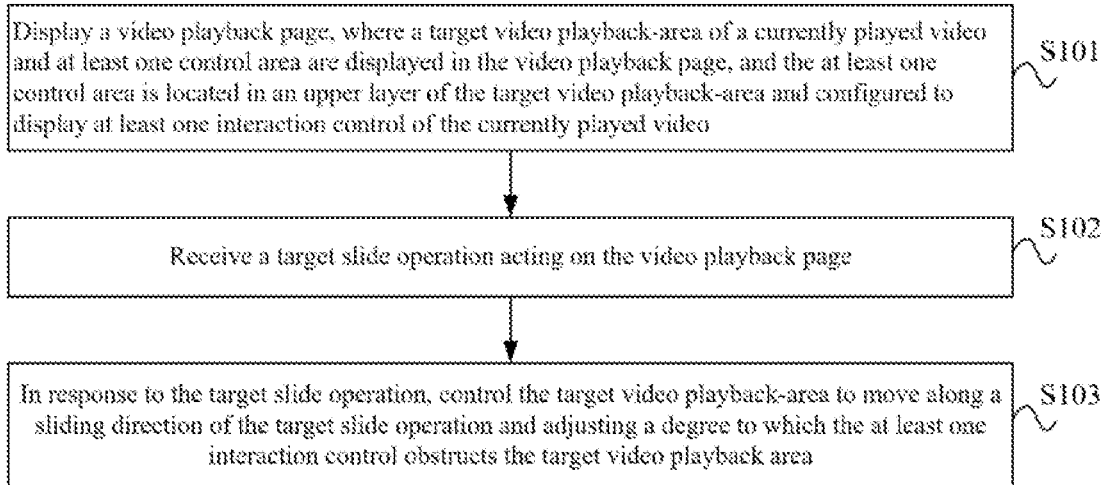

Display a video playback page, where a target video playback-area of a currently played video and at least one control area are displayed in the video playback page, and the at least one control area is located in an upper layer of the target video playback-area and configured to display at least one interaction control of the currently played video    S101

Receive a target slide operation acting on the video playback page    S102

In response to the target slide operation, control the target video playback-area to move along a sliding direction of the target slide operation and adjusting a degree to which the at least one interaction control obstructs the target video playback area    S103

FIG. 1

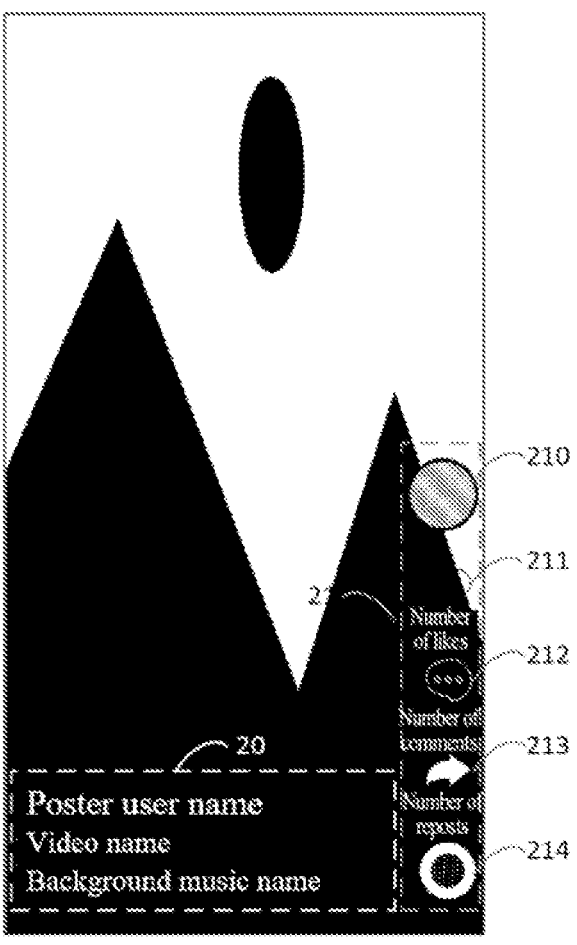

210
211
Number of likes
212
Number of comments
213
Number of reposts
214

20
Poster user name
Video name
Background music name

FIG. 2

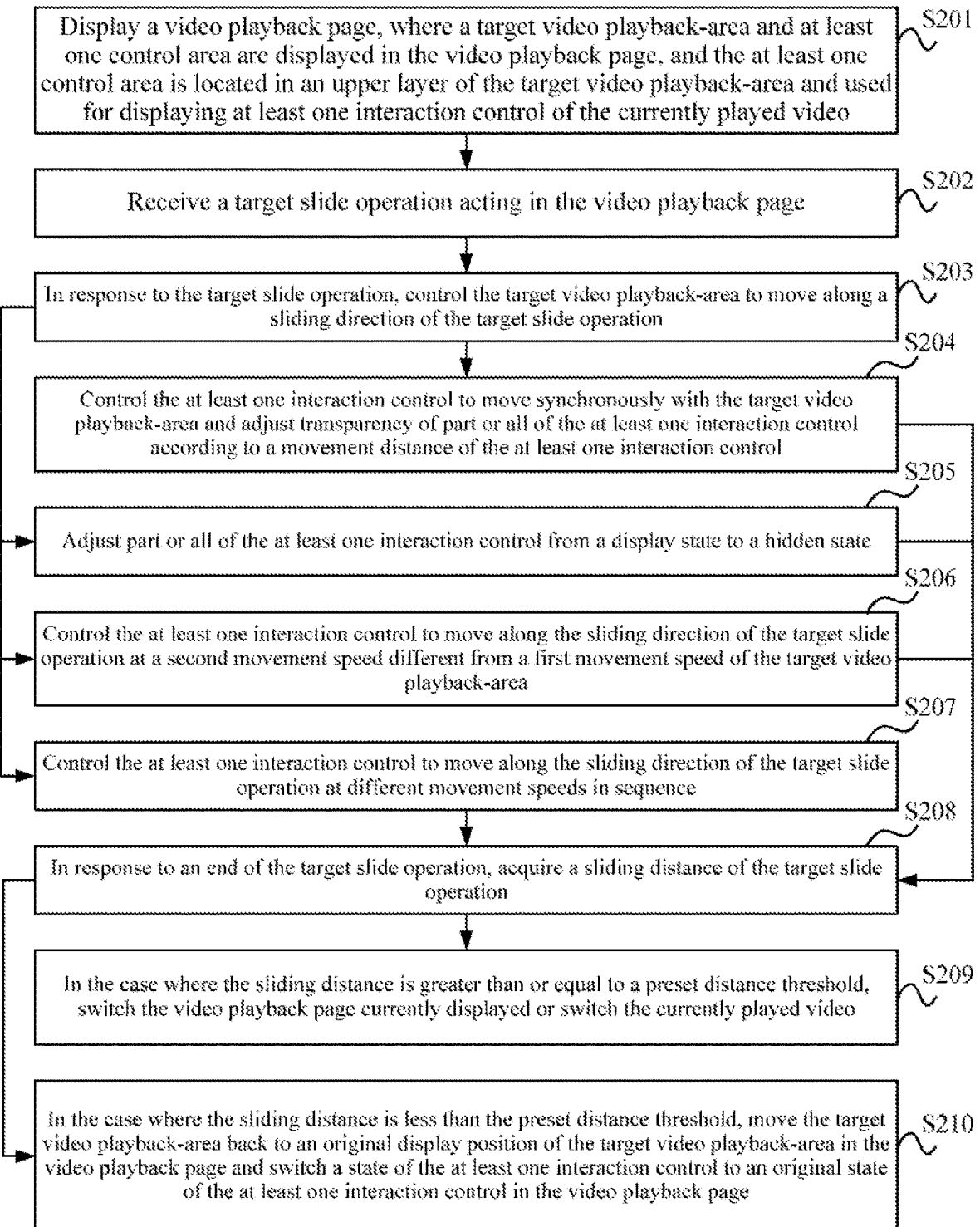

Display a video playback page, where a target video playback-area and at least one control area are displayed in the video playback page, and the at least one control area is located in an upper layer of the target video playback-area and used for displaying at least one interaction control of the currently played video ⌇S201

Receive a target slide operation acting in the video playback page ⌇S202

In response to the target slide operation, control the target video playback-area to move along a sliding direction of the target slide operation ⌇S203

Control the at least one interaction control to move synchronously with the target video playback-area and adjust transparency of part or all of the at least one interaction control according to a movement distance of the at least one interaction control ⌇S204

Adjust part or all of the at least one interaction control from a display state to a hidden state ⌇S205

Control the at least one interaction control to move along the sliding direction of the target slide operation at a second movement speed different from a first movement speed of the target video playback-area ⌇S206

Control the at least one interaction control to move along the sliding direction of the target slide operation at different movement speeds in sequence ⌇S207

In response to an end of the target slide operation, acquire a sliding distance of the target slide operation ⌇S208

In the case where the sliding distance is greater than or equal to a preset distance threshold, switch the video playback page currently displayed or switch the currently played video ⌇S209

In the case where the sliding distance is less than the preset distance threshold, move the target video playback-area back to an original display position of the target video playback-area in the video playback page and switch a state of the at least one interaction control to an original state of the at least one interaction control in the video playback page ⌇S210

FIG. 3

CONTROL DISPLAY METHOD, ELECTRONIC DEVICE, AND NON-TRANSITORY COMPUTER-READABLE STORAGE MEDIUM

CROSS REFERENCE TO RELATED APPLICATIONS

This is a Continuation Application of International Patent Application No. PCT/CN2022/086240, filed Apr. 12, 2022, which claims priority to Chinese Patent Application No. 202110413121.9 filed Apr. 16, 2021, the disclosures of which are incorporated herein by reference in their entireties.

TECHNICAL FIELD

Embodiments of the present disclosure relate to the field of video play technology, for example, a control display method, an electronic device, and a non-transitory computer-readable storage medium.

BACKGROUND

At present, users can view videos, which are provided by a platform or posted by other users, in a video playback page provided by a video application.

In the related art, when a video is played in a video playback page, video application software generally displays an interaction control of the currently played video in an upper layer of a video playback-area of the played video, such as a like control, a comment control, a repost control, or a video pendant, where a user may trigger the interaction control for interaction.

However, the interaction control may obstruct the video playback-area of the currently played video, and the user can view the video playback-area obstructed by the interaction control only after a series of operations, causing cumbersome operations and low efficiency.

SUMMARY

Embodiments of the present disclosure provide a control display method, an electronic device, and a non-transitory computer-readable storage medium, so as to simplify operations required for viewing a video playback-area obstructed by an interaction control.

Embodiments of the present disclosure provide a control display method. The method includes the steps described below.

A video playback page is displayed, where a target video playback-area of a currently played video and at least one control area are displayed in the video playback page, and the at least one control area is located in an upper layer of the target video playback-area and configured to display at least one interaction control of the currently played video.

A target slide operation acting on the video playback page is received.

In response to the target slide operation, the target video playback-area is controlled to move along a sliding direction of the target slide operation and a degree to which the at least one interaction control obstructs the target video playback-area is adjusted.

Embodiments of the present disclosure further provide an electronic device including at least one processor and a memory.

The memory is configured to store at least one program.

The at least one program, when executed by the at least one processor, causes the at least one processor to perform the control display method described in the embodiments of the present disclosure.

Embodiments of the present disclosure further provide a computer-readable storage medium on which a computer program is stored, where the computer program, when executed by a processor, implements the control display method described in the embodiments of the present disclosure.

BRIEF DESCRIPTION OF DRAWINGS

The above and other features, advantages, and aspects of embodiments of the present disclosure become more apparent with reference to the embodiments described below in conjunction with drawings. The same or similar reference numerals throughout the drawings denote the same or similar elements. It is to be understood that the drawings are illustrative and that originals and elements are not necessarily drawn to scale.

FIG. 1 is a flowchart of a control display method according to an embodiment of the present disclosure.

FIG. 2 is a schematic diagram of a video playback page according to an embodiment of the present disclosure.

FIG. 3 is a flowchart of another control display method according to an embodiment of the present disclosure.

DETAILED DESCRIPTION

Figure 4:
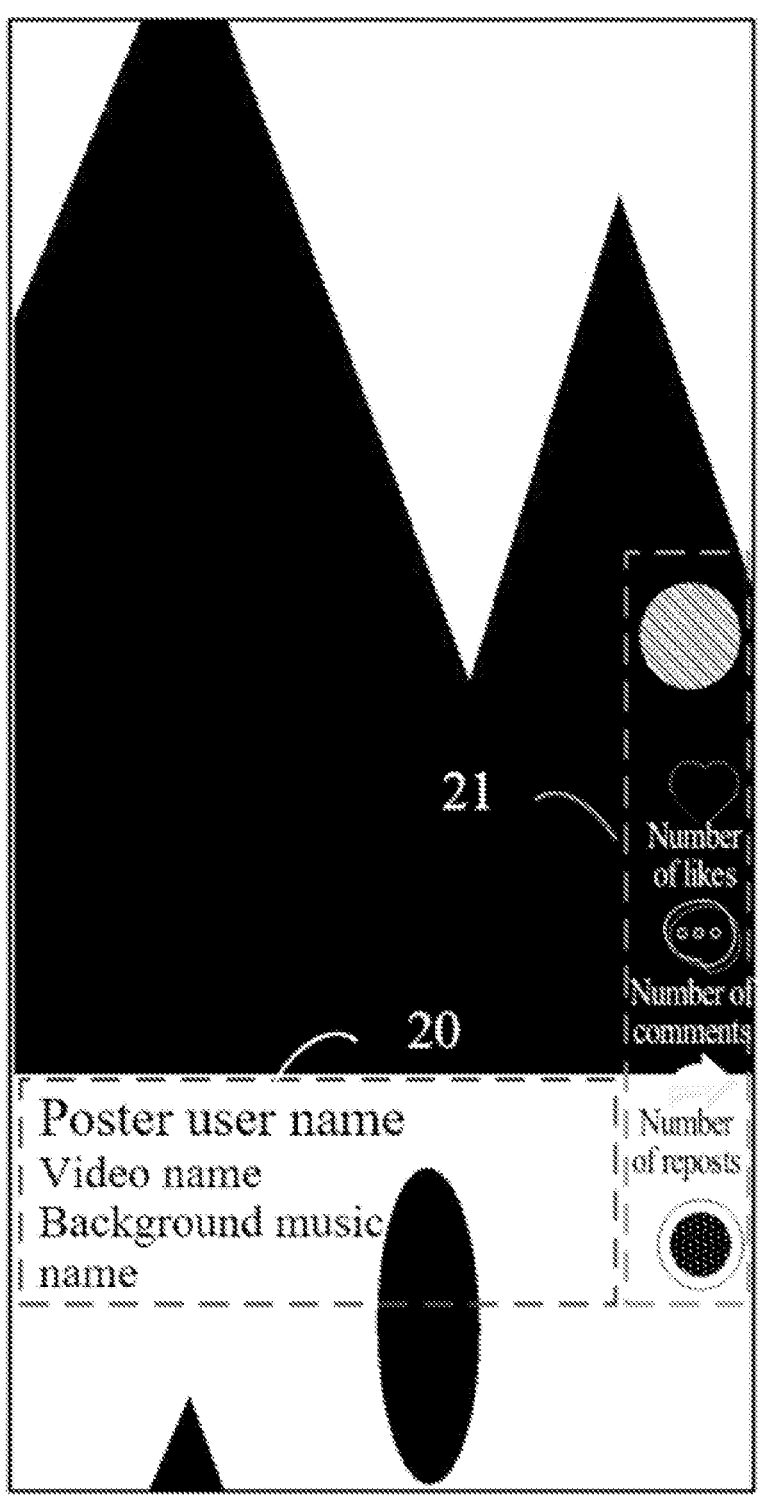
FIG. 4 is a schematic diagram of another video playback page according to an embodiment of the present disclosure.

Embodiments of the present disclosure are described in more detail hereinafter with reference to drawings. Although some embodiments of the present disclosure are shown in the drawings, it is to be understood that the present disclosure may be implemented in various forms and should not be interpreted as being limited to the embodiments set forth herein. Conversely, these embodiments are provided for a more thorough and complete understanding of the present disclosure. It is to be understood that the drawings and the embodiments of the present disclosure are illustrative and not intended to limit the scope of the present disclosure.

It is to be understood that steps recited in method embodiments of the present disclosure may be performed in a different order and/or performed in parallel. Additionally, the method embodiments may include additional steps and/or omit the execution of illustrated steps. The scope of the present disclosure is not limited in this respect.

As used herein, the term "include" and variations thereof are intended to be inclusive, that is, "including, but not limited to". The term "based on" is "at least partially based on". The term "an embodiment" refers to "at least one embodiment"; the term "another embodiment" refers to "at least one another embodiment"; and the term "some embodiments" refers to "at least some embodiments". Related definitions of other terms are given hereinafter.

It is to be noted that concepts such as "first" and "second" mentioned in the present disclosure are intended to distinguish between different apparatuses, modules, or units and not to limit a sequence of or interdependence between functions implemented by the apparatuses, modules, or units.

It is to be noted that a modifier. "one" or "multiple", mentioned in the present disclosure is illustrative and non-restrictive and those skilled in the art should understand that the modifier is to be interpreted as "at least one" unless otherwise clearly indicated in the context.

Names of messages or information exchanged between multiple apparatuses in embodiments of the present disclosure are used for an illustrative purpose and are not to limit the scope of such messages or information.

FIG. 1 is a flowchart of a control display method according to an embodiment of the present disclosure. The method may be performed by a control display apparatus which may be implemented by software and/or hardware and may be configured in an electronic device. Typically, the apparatus may be configured in a mobile phone or a tablet computer. The control display method provided in the embodiment of the present disclosure is applicable to a scenario where a video playback-area obstructed by an interaction control is viewed. As shown in FIG. 1, the control display method provided in the embodiment may include S101, S102, and S103.

In S101, a video playback page is displayed, where a target video playback-area of a currently played video and at least one control area are displayed in the video playback page, and the at least one control area is located in an upper layer of the target video playback-area and configured to display at least one interaction control of the currently played video.

The video playback page may be understood as a page for playing a video. The currently played video may be a video played in the video playback page at a current moment. The target video playback-area may be a video playback-area of the currently played video. The interaction control of the currently played video may be a control displayed in the video playback page and used for a user to interact with the currently played video or a poster of the currently played video, such as a follow control for the user to follow a poster of a current target video, a like control for the user to like the currently played video, a comment control for the user to comment on the currently played video, a quick expression comment control for the user to quickly comment on the currently played video, a repost control for the user to repost the currently played video, a poster avatar and/or a poster user name for the user to view a personal home page of a poster of a current video, a music disc control and/or a background music title for the user to view a page of details of background music in the currently played video, a video pendant, and/or other controls for the user to interact.

For example, as shown in FIG. 2 (in which two control areas are provided in the video playback page as an example), based on a trigger operation of the user, the electronic device may display the video playback page, play the currently played video in the video playback page (that is, display the video playback-area of the currently played video in the video playback page), display the at least one control area in a top layer (for example, the upper layer of the video playback-area of the currently played video) of the video playback page, and display the corresponding interaction control in each control area. For example, text controls such as a poster user name and a background music name for the currently played video may be displayed in a first control area 20, and icon controls such as a poster avatar 210, a like control 211, a comment control 212, a repost control 213, and a music disc control 214 for the currently played video may be displayed in a second control area 21.

In S102, a target slide operation acting on the video playback page is received.

The target slide operation may be a slide operation whose initial sliding direction is a set direction, for example, a slide operation whose initial sliding direction is upward, downward, leftward, or rightward. The target slide operation may be used for instructing the electronic device to control the video playback-area of the currently played video to move and adjust a degree to which the at least one interaction control obstructs the target video playback-area and may also be used for instructing the electronic device to switch the currently played video or the video playback page currently displayed. For example, when the initial sliding direction is upward or downward, the target slide operation is used for instructing the electronic device to switch the currently played video in the video playback page; when the sliding direction is leftward or rightward, the target slide operation is used for instructing the electronic device to switch the video playback page currently displayed to another page, for example, to switch the video playback page currently displayed to another video playback page or a non-video playback page. An example in which the target slide operation is a slide operation whose initial sliding direction is upward is used below for illustration.

For example, the electronic device displays the target video playback-area of the currently played video in the video playback page and displays the interaction control of the currently played video in the upper layer of the target video playback-area. When the user desires to switch the currently played video in the video playback page and/or when the user desires to view a target video sub-playback-area obstructed by the interaction control of the currently played video, the user may slide upward in the video playback page; accordingly, when detecting that the user slides upward in the video playback page, the electronic device may determine that the target slide operation is received.

In S103, in response to the target slide operation, the target video playback-area is controlled to move along a sliding direction of the target slide operation and a degree to which the at least one interaction control obstructs the target video playback-area is adjusted.

For example, when receiving the target slide operation, the electronic device may control the target video playback-area of the currently played video displayed in the video playback page to move along the sliding direction of the target slide operation and adjust the degree to which the interaction control of the currently played video displayed in the video playback page obstructs the target video playback-area in a sliding process of the target slide operation. For example, a relative position between the at least one interaction control and the target video playback-area of the currently played video is adjusted, display transparency of the at least one interaction control is adjusted, the at least one interaction control is adjusted to a hidden state, or a hierarchical relationship between the at least one interaction control and the target video playback-area of the currently played video is adjusted (for example, the at least one interaction control is adjusted to be displayed in a lower layer of the target video playback-area) so that a video playback-area obstructed by the at least one interaction control in the target video playback-area of the currently played video is displayed to the user.

When the target video playback-area of the currently played video is controlled to move along the sliding direction of the target slide operation, a movement speed of the target video playback-area may be greater than, equal to, or less than a movement speed of a touch point of the target slide operation. In an embodiment, the movement speed of the target video playback-area may be equal to the movement speed of the touch point of the target slide operation. That is, the target video playback-area of the currently played video may be optionally controlled to move at the movement speed of the touch point of the target slide operation, so as to improve the interaction experience of the user.

In an embodiment, the control display method provided in the embodiment may further include that: a page that is to be switched to corresponding to the target slide operation is controlled to move synchronously with the target video playback-area to display part of page content of the page that is to be switched to; or a video playback-area that is to be switched to of a video that is to be switched to corresponding to the target slide operation is controlled to move synchronously with the target video playback-area to display part of a video playback-area of the video that is to be switched to in the video playback page.

In the preceding implementation, when the target slide operation may also be used for instructing the electronic device to switch the video playback page currently displayed or to switch the currently played video, the electronic device may also control the page that is to be switched to/video that is to be switched to corresponding to the target slide operation to move synchronously with the target video playback-area of the currently played video when controlling the target video playback-area of the currently played video to move along the sliding direction of the target slide operation, so as to simultaneously display part of content of the video playback page currently displayed and part of content of the page that is to be switched to or to simultaneously display part of the playback-area of the currently played video and part of the playback-area of the video that is to be switched to in the video playback page, for convenience to preview the content of the page that is to be switched to/video that is to be switched to.

The page that is to be switched to/video that is to be switched to may be a page/video corresponding to the sliding direction of the target slide operation. That is, when the target slide operation is used for switching a page, the page that is to be switched to is the page corresponding to the sliding direction of the target slide operation; when the target slide operation is used for switching the currently played video, the video that is to be switched to is the video corresponding to the sliding direction of the target slide operation. Here, whether the target slide operation is used for switching a page or a video may be determined based on the sliding direction of the target slide operation and the like.

For example, a transverse slide operation may be used for instructing the electronic device to switch the page and a longitudinal slide operation may be used for instructing the electronic device to switch the currently played video. After receiving the target slide operation, the electronic device may determine the sliding direction of the target slide operation in response to the target slide operation. In the case where the sliding direction is leftward or rightward, the page corresponding to the sliding direction may be determined to be the page that is to be switched to, and the video playback page currently displayed and the page that is to be switched to are controlled to synchronously move along the sliding direction, so as to simultaneously display part of page content of the video playback page and part of the page content of the page that is to be switched to. In the case where the sliding direction is upward or downward, a next video or a previous video of the currently played video corresponding to the sliding direction in a video stream of the video playback page may be determined to be the video that is to be switched to, and the video playback-area of the currently played video and the video playback-area of the video that is to be switched to are controlled to synchronously move along the sliding direction, so as to simultaneously display part of the video playback-area of the currently played video and part of the video playback-area of the video that is to be switched to in the video playback page.

In the embodiment, not only a state of the at least one interaction control of the currently played video is adjusted simultaneously based on the slide operation of the user, but also a state of a certain interaction control of the currently played video may be separately adjusted based on a long press operation of the user, so as to satisfy different adjustment requirements of the user. In this case, in an embodiment, after the video playback page is displayed, the method further includes that: a long press operation acting on a target interaction control is received, where a time length of the long press operation is greater than or equal to a second preset time length; and in response to the long press operation, the target interaction control is adjusted from a display state to a hidden state. The target interaction control may be an interaction control corresponding to the long press operation, that is, an interaction control pressed by the user for a long time. The second preset time length may be set by a developer as required. For example, the second preset time length may be set to be a time length such as 0.5 s or 1 s.

For example, the electronic device displays the target video playback-area of the currently played video in the video playback page and displays the interaction control of the currently played video in the upper layer of the target video playback-area. Therefore, when the user desires to hide a certain interaction control or desires to view a target video sub-playback-area obstructed by a certain interaction control, the user may press the interaction control for a long time; accordingly, when detecting that a time length for which the user presses a certain interaction control reaches the second preset time length, the electronic device may determine that the long press operation acting on the interaction control is received and adjust the interaction control from the display state to the hidden state in response to the long press operation, for example, adjust the transparency of the interaction control to be fully transparent or cancel the display of the interaction control (that is, stop displaying the interaction control in the video playback page).

It is to be understood that in addition to the interaction control, video information (such as a video name of the currently played video) and/or background music information of the currently played video may be displayed in the control area. In this case, when the state of the interaction control is adjusted, a state of information displayed in the control area may be adjusted simultaneously, so as to display a target video sub-playback-area obstructed by the content (including the interaction control and a non-interaction control) displayed in the control area. For example, when the target interaction control is adjusted from the display state to the hidden state, in the case where information corresponding to the target interaction control is displayed in the control area, the information may be simultaneously adjusted from the display state to the hidden state. For example, when the target interaction control is the poster user name of the currently played video, in the case where the video information of the currently played video is displayed in the video playback page, the poster user name and the video information may be simultaneously adjusted from the display state to the hidden state. When the target interaction control is the background music name of the currently played video, in the case where the background music information of the currently played video is displayed in the video playback page, the background music name and the background music information may be simultaneously adjusted from the display state to the hidden state.

According to the control display method provided in the embodiment, the video playback page is displayed, where the target video playback-area of the currently played video is displayed in the video playback page, and the at least one control area for displaying the interaction control of the currently played video is displayed in the upper layer of the target video playback-area, the target slide operation acting on the video playback page is received, and in response to the target slide operation, the target video playback-area of the currently played video is controlled to move along the sliding direction of the target slide operation and the degree to which the interaction control displayed in the at least one control area obstructs the target video playback-area is adjusted. In the embodiment, by use of the preceding technical solutions, the user can view the video playback-area obstructed by the interaction control through a simple slide operation so that operations required by the user for viewing the video playback-area obstructed by the interaction control can be simplified, improving the viewing efficiency of the user and the video viewing experience of the user.

FIG. 3 is a flowchart of another control display method according to an embodiment of the present disclosure. Schemes in the embodiment may be combined with at least one scheme in the preceding embodiment. In an embodiment, the step in which the degree to which the at least one interaction control obstructs the target video playback-area is adjusted includes that: the at least one interaction control is controlled to move synchronously with the target video playback-area and transparency of part or all of the at least one interaction control is adjusted according to a movement distance of the at least one interaction control, where the transparency is positively correlated to the movement distance.

In an embodiment, the step in which the degree to which the at least one interaction control obstructs the target video playback-area is adjusted includes that: part or all of the at least one interaction control is adjusted from a display state to a hidden state.

In an embodiment, the step in which the state of the at least one interaction control is adjusted includes that: the at least one interaction control is controlled to move along the sliding direction of the target slide operation at a second movement speed different from a first movement speed of the target video playback-area; or the at least one interaction control is controlled to move along the sliding direction of the target slide operation at different movement speeds in sequence.

In an embodiment, the control display method provided in the embodiment may further include that: in response to an end of the target slide operation, a sliding distance of the target slide operation is acquired: in the case where the sliding distance is greater than or equal to a preset distance threshold, the video playback page currently displayed is switched or the currently played video is switched; and in the case where the sliding distance is less than the preset distance threshold, the target video playback-area is moved back to an original display position of the target video playback-area in the video playback page and the state of the at least one interaction control is switched to an original state of the at least one interaction control in the video playback page.

Accordingly, as shown in FIG. 3, the control display method provided in the embodiment may include S201 to S210.

In S201, a video playback page is displayed, where a target video playback-area of a currently played video and at least one control area are displayed in the video playback page, and the at least one control area is located in an upper layer of the target video playback-area and configured to display at least one interaction control of the currently played video.

In S202, a target slide operation acting on the video playback page is received.

In S203, in response to the target slide operation, the target video playback-area is controlled to move along a sliding direction of the target slide operation, and S204, S205, S206, or S207 is performed, so as to display a target video sub-playback-area obstructed by the at least one interaction control.

In S204, the at least one interaction control is controlled to move synchronously with the target video playback-area and transparency of part or all of the at least one interaction control is adjusted according to a movement distance of the at least one interaction control. Then, S208 is performed. The transparency is positively correlated to the movement distance.

The movement distance of the interaction control may be understood as a distance between a current position of the interaction control and an original position of the interaction control in the video playback page before the target slide operation is received.

In the embodiment, in a sliding process of the target slide operation, an electronic device may control the at least one interaction control of the currently played video to move along the sliding direction of the target slide operation and adjust the transparency of part or all of the at least one interaction control of the currently played video displayed in the video playback page according to the movement distance of the at least one interaction control. That is, when the at least one interaction control moves in a direction away from the original position of the at least one interaction control, the transparency of part or all of the at least one interaction control of the currently played video is increased so that it is convenient for the user to view the target video sub-playback-area of the currently played video obstructed by the at least one interaction control; when the at least one interaction control moves in a direction toward the original position of the at least one interaction control, the transparency of part or all of the at least one interaction control of the currently played video is reduced. Here, when the transparency of part of the at least one interaction control of the currently played video is adjusted according to the movement distance of the at least one interaction control, the part of the at least one interaction control may be determined randomly, determined based on setting information or a selection operation of the user, or determined based on a setting of a developer, which is not limited in the embodiment.

For example, the target slide operation is a longitudinal slide operation whose initial sliding direction is upward. When detecting that the user slides upward, the electronic device may control the target video playback-area and the at least one interaction control of the currently played video to synchronously move upward (that is, the at least one interaction control moves at the same speed and in the same direction as the target video playback-area) and gradually increase the transparency of part or all of the at least one interaction control of the currently played video in an upward movement process; when detecting that the user changes from sliding upward to sliding downward, the electronic device controls the target video playback-area and the at least one interaction control of the currently played video to synchronously move downward and gradually reduces the transparency of the part or all of the at least one interaction control of the currently played video in a downward movement process. The transparency of the interaction control to be increased or reduced to at each position may be determined according to the movement distance of the interaction control, and a correspondence relationship between the movement distance and the transparency may be preset by the developer.

In S205, part or all of the at least one interaction control is adjusted from a display state to a hidden state.

In the embodiment, in the sliding process of the target slide operation, the electronic device may hide part or all of the at least one interaction control of the currently played video displayed in the video playback page, for example, adjust part or all of the at least one interaction control of the currently played video to be fully transparent or cancel the display of part or all of the at least one interaction control of the currently played video displayed in the video playback page (for example, move part or all of the at least one interaction control of the currently played video out of the video playback page) and may control an interaction control not adjusted to the hidden state among the at least one interaction control of the currently played video to remain stationary or to move synchronously with the target video playback-area of the currently played video so that it is convenient for the user to view the video playback-area of the currently played video obstructed by a certain interaction control or multiple interaction controls. Here, when part of the at least one interaction control of the currently played video is adjusted from the display state to the hidden state, the part of the at least one interaction control may be determined randomly, determined based on setting information or a selection operation of the user, or determined based on a setting of the developer, which is not limited in the embodiment.

In S206, the at least one interaction control is controlled to move along the sliding direction of the target slide operation at a second movement speed different from a first movement speed of the target video playback-area. Then, S208 is performed.

The first movement speed may be a movement speed of the target video playback-area of the currently played video. The second movement speed may be a movement speed different from the first movement speed, for example, a movement speed a ratio of which to the first movement speed is a preset ratio or a movement speed a difference of which from the first movement speed is a preset difference, which is not limited in the embodiment. Here, when the first movement speed changes with time, the second movement speed may also change with time. In this case, that the second movement speed is different from the first movement speed may be understood as that an instantaneous value of the second movement speed at each moment is different from an instantaneous value of the first movement speed at the corresponding moment.

In the embodiment, when the target video playback-area is controlled to move along the sliding direction of the target slide operation, the at least one interaction control may be simultaneously controlled to move at the second movement speed different from the first movement speed of the target video playback-area. For example, the at least one interaction control may be controlled to synchronously move along the sliding direction of the target slide operation at a certain speed greater than or less than the first movement speed until the target slide operation ends. Therefore, the at least one interaction control and the target video playback-area are displayed in a staggered manner, and the case where the interaction control always obstructs a certain part of the target video playback-area is avoided so that the user can view the content obstructed by the interaction control.

For example, the target slide operation is a longitudinal slide whose initial sliding direction is upward. When it is detected that the user slides upward in the video playback page, the first movement speed (for example, a speed at which the user slides upward is determined to be the first movement speed) of the target video playback-area of the currently played video may be determined, the second movement speed of the at least one interaction control may be determined according to the first movement speed, the target video playback-area of the currently played video may be controlled to move upward at the first movement speed, and the at least one interaction control may be controlled to synchronously move upward at the second movement speed. When it is detected that the user changes from sliding upward to sliding downward, the target video playback-area of the currently played video may be controlled to move downward at the first movement speed, and the at least one interaction control may be controlled to synchronously move downward at the second movement speed.

It is to be understood that in the embodiment, only part of the at least one interaction control of the currently played video may be controlled to move along the sliding direction of the target slide operation at the second movement speed different from the first movement speed of the target video playback-area and other interaction controls of the currently played video may be controlled to remain stationary or to move at the first movement speed. Additionally, when part or all of the at least one interaction control of the currently played video is controlled to move at the second movement speed, the transparency of each interaction control of the currently played video may not be adjusted; or the transparency of an interaction control not moving, the transparency of an interaction control moving at the first movement speed, or the transparency of an interaction control moving at the second movement speed among the at least one interaction control of the currently played video may be adjusted according to the movement distance of an interaction control moving at the first movement speed or the movement distance of an interaction control moving at the second movement speed, which is not limited in the embodiment.

In S207, the at least one interaction control is controlled to move along the sliding direction of the target slide operation at different movement speeds in sequence. Then, S208 is performed.

In the embodiment, when the target video playback-area is controlled to move along the sliding direction of the target slide operation, the at least one interaction control may be controlled to move at different movement speeds in sequence. For example, the at least one interaction control may be controlled to synchronously move along the sliding direction of the target slide operation at a relatively small movement speed at first, and when the at least one interaction control moves for a set time or a set distance or moves until a certain control area does not overlap the target video playback-area of the currently played video, the at least one interaction control may be controlled to synchronously move along the sliding direction of the target slide operation at a relatively large movement speed, ensuring that the user can view the target video playback-area obstructed by the interaction control and improving fun in moving the target video playback-area and the at least one interaction control.

In an embodiment, the step in which the at least one interaction control is controlled to move along the sliding direction of the target slide operation at different movement speeds in sequence includes that: in the case where the target slide operation is a slide along an initial first direction, the at least one interaction control is controlled to move along the first direction at the second movement speed; and in response to a target control area moving out of the target video playback-area, the movement speed of the at least one interaction control is adjusted from the second movement speed to the first movement speed.

The first direction may be understood as the initial sliding direction of the target slide operation, where the initial sliding direction may be upward, downward, leftward, rightward, or the like. The second movement speed may be greater than or less than the first movement speed. The target control area may be a certain control area of the currently played video, which may be any control area or a preset control area of the currently played video, which is not limited in the embodiment.

Referring to FIG. 2, for example, the first direction is upward, the second movement speed is less than the first movement speed, and the target control area is a first control area 20. When it is detected that the user slides upward in the video playback page, the target video playback-area of the currently played video displayed in the video playback page may be controlled to move upward at the first movement speed, the at least one interaction control of the currently played video displayed in the video playback page may be controlled to move upward at the second movement speed (that is, the at least one control area is controlled to move upward at the second movement speed), and whether an overlapping area exists between the target control area and the target video playback-area of the currently played video may be periodically detected in the movement process. In the case where an overlapping area exists between the target control area and the target video playback-area of the currently played video, the at least one interaction control continues to be controlled to move upward at the second movement speed until no overlapping area exists between the target control area and the target video playback-area of the currently played video. In the case where no overlapping area exists between the target control area and the target video playback-area of the currently played video, that is, when an upper boundary line of the target control area overlaps a lower boundary line of the target video playback-area of the currently played video (as shown in FIG. 4) or when the upper boundary line of the target control area moves below the lower boundary line of the target video playback-area of the currently played video, the movement speed of the at least one interaction control is adjusted from the second movement speed to the first movement speed, that is, the at least one interaction control is controlled to move upward at a movement speed which is the same as the movement speed of the target video playback-area of the currently played video.

In the preceding implementation, when no overlapping area exists between the target control area and the target video playback-area of the currently played video, the at least one interaction control and the target video playback-area may be controlled to move along the first direction at the first movement speed until the sliding direction of the target slide operation changes or the target slide operation ends. Alternatively, after the at least one interaction control moves at the first movement speed for a preset time, the at least one interaction control may be controlled to move along the first direction at a third movement speed until the sliding direction of the target slide operation changes or the target slide operation ends. In this case, in an embodiment, after the movement speed of the at least one interaction control is adjusted from the second movement speed to the first movement speed, the method further includes that: when a time length for which the at least one interaction control moves at the first movement speed reaches a first preset time length, the movement speed of the at least one interaction control is adjusted from the first movement speed to the third movement speed, where the first movement speed is between the second movement speed and the third movement speed in order of magnitude. Here, the first preset time length may be set by the developer as required. For example, the first preset time length may be set to be a time length such as is or 1.5 s. A difference between the third movement speed and the first movement speed has a symbol opposite to a symbol of a difference between the second movement speed and the first movement speed. That is, when the second movement speed is less than the first movement speed, the third movement speed is greater than the second movement speed, and when the second movement speed is greater than the first movement speed, the third movement speed is less than the second movement speed.

In the preceding implementation, the control display method provided in the embodiment may further include that: when the sliding direction of the target slide operation is switched to a second direction opposite to the first direction, the at least one interaction control is controlled to move along the second direction, where a switching order of movement speeds at which the at least one interaction control moves along the second direction is reverse to a switching order of movement speeds at which the at least one interaction control moves along the first direction.

In the embodiment, when the sliding direction of the target slide operation is switched to an opposite direction (that is, the second direction), the target video playback-area and the at least one interaction control of the currently played video may be controlled to move in the opposite direction, and the movement speed of the at least one interaction control may be switched in an order reverse to the switching order of movement speeds at which the at least one interaction control moves along the first direction in the movement process. For example, in the case where the at least one interaction control moves upward along the first direction at the second movement speed, the first movement speed, and the third movement speed in sequence in the process of the target slide operation sliding along the first direction, after the target slide operation is switched from the first direction to the second direction, the movement speed of the at least one interaction control may be switched in an order of the third movement speed, the first movement speed, and the second movement speed until the sliding direction of the target slide operation changes again or the target slide operation ends, which is not limited in the embodiment.

For example, the first direction is upward, the second movement speed is less than the first movement speed, and the target control area is the first control area. Assuming that the target slide operation changes from sliding upward to sliding downward when the at least one interaction control moves upward at the third movement speed, in the process of the target slide operation sliding downward, the at least one interaction control may be controlled to move downward at the third movement speed at first. When the at least one interaction control moves until the upper boundary line of the target control area overlaps the lower boundary line of the target video playback-area of the currently played video, the at least one interaction control is controlled to move downward at the first movement speed. When the time for which the at least one interaction control moves downward at the first movement speed reaches the first preset time length, the movement speed of the at least one interaction control is adjusted from the first movement speed to the second movement speed.

It is to be understood that in the embodiment, only part of the at least one interaction control of the currently played video may be controlled to move along the sliding direction of the target slide operation at different movement speeds in sequence and other interaction controls of the currently played video may be controlled to remain stationary or to move at the same movement speed (for example, the first movement speed). Additionally, when part or all of the at least one interaction control of the currently played video is controlled to move at different movement speeds in sequence, the transparency of each interaction control of the currently played video may not be adjusted; or the transparency of an interaction control not moving, the transparency of an interaction control moving at the same movement speed, or the transparency of an interaction control moving at different movement speeds in sequence among the at least one interaction control of the currently played video may be adjusted according to the movement distance of an interaction control moving at the same speed or the movement distance of an interaction control moving at different movement speeds in sequence, which is not limited in the embodiment. When part of the at least one interaction control is controlled to move at different movement speeds in sequence, the part of the at least one interaction control may be optionally determined according to the control area where the at least one interaction control is located. That is, all interaction controls in a certain control area or multiple control areas are optionally controlled to synchronously move at the second movement speed in sequence, for convenience to determine whether a control area moves out of the target video playback-area.

In S208, in response to an end of the target slide operation, a sliding distance of the target slide operation is acquired. Then, S209 or S210 is performed.

The sliding distance of the target slide operation may be understood as a distance between a sliding end point and a sliding start point of the target slide operation.

For example, when the target slide operation ends, for example, when it is detected that a touch point corresponding to the target slide operation disappears, position coordinates (that is, coordinates of a position where the touch point corresponding to the target slide operation disappears) of the sliding end point of the target slide operation and position coordinates of the sliding start point of the target slide operation may be acquired, and the sliding distance of the target slide operation may be calculated according to the position coordinates of the sliding end point and the position coordinates of the sliding start point, for convenience to subsequently determine, according to the sliding distance, whether to switch the video playback page currently displayed or whether to switch the currently played video in the video playback page.

In S209, in the case where the sliding distance is greater than or equal to a preset distance threshold, the video playback page currently displayed is switched or the currently played video is switched.

In the embodiment, a page-switching or video-switching operation may be performed only when the sliding distance of the target slide operation is greater than or equal to the preset distance threshold, so as to avoid false triggers.

For example, when the sliding distance of the target slide operation is greater than or equal to the preset distance threshold, the corresponding switching operation may be performed according to the overall sliding direction (that is, a direction from the sliding start point to the sliding end point) of the target slide operation. For example, when the overall sliding direction is upward, the currently played video in the video playback page may be switched to a next video in a video stream; when the overall sliding direction is downward, the currently played video in the video playback page may be switched to a previous video in the video stream; when the overall sliding direction is leftward or rightward, the video playback page currently displayed may be switched to a corresponding video playback page or a non-video playback page, and so on. The preset distance threshold may be set by the developer as required.

In S210, in the case where the sliding distance is less than the preset distance threshold, the target video playback-area is moved back to an original display position of the target video playback-area in the video playback page and a state of the at least one interaction control is switched to an original state of the at least one interaction control in the video playback page.

The original display position of the target video playback-area in the video playback page may be a display position of the target video playback-area in the video playback page before the target slide operation is received. The original state of the at least one interaction control in the video playback page may be a state of the at least one interaction control in the video playback page before the target slide operation is received.

In the embodiment, when the sliding distance of the target slide operation is less than the preset distance threshold, the page switching or video switching operation may not be performed, the display position of the target video playback-area of the currently played video in the video playback page may be adjusted to the original display position before the target video playback-area is moved in response to a target trigger operation, and the state of the at least one interaction control in the video playback page may be adjusted to the original state before the at least one interaction control is adjusted in response to the target trigger operation. For example, a display position of the at least one interaction control is adjusted to the display position of the at least one interaction control in the video playback page before the target trigger operation is received, the transparency of the at least one interaction control is adjusted to original display transparency of the at least one interaction control in the video playback page before the target trigger operation is received, and/or the at least one interaction control is adjusted from the hidden state to the display state.

According to the control display method provided in the embodiment, in the sliding process of the user, the transparency of all or part of the at least one interaction control of the currently played video can be adjusted, all or part of the at least one interaction control of the currently played video can be hidden, or a relative position between the interaction control of the currently played video and the video playback-area displayed in the video playback page or the transparency of the interaction control can be adjusted, or the interaction control can be hidden so that the user can view video content obstructed by the interaction control and the false triggers can be avoided, improving user experience.

Figure 5:
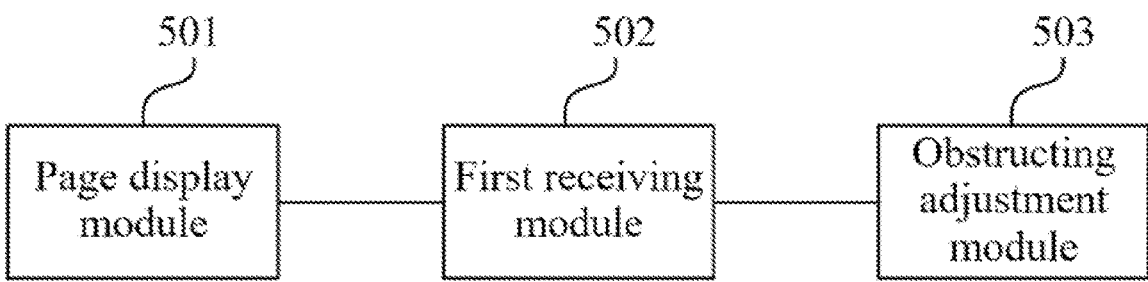
FIG. 5 is a block diagram of a control display apparatus according to an embodiment of the present disclosure.

FIG. 5 is a block diagram of a control display apparatus according to an embodiment of the present disclosure. The apparatus may be implemented by software and/or hardware and may be configured in an electronic device. Typically, the apparatus may be configured in a mobile phone or a tablet computer. The apparatus may adjust a state of a control by performing a control display method. As shown in FIG. 5, the control display apparatus provided in the embodiment may include a page display module 501, a first receiving module 502, and an obstructing adjustment module 503.

The page display module 501 is configured to display a video playback page, where a target video playback-area of a currently played video and at least one control area are displayed in the video playback page, and the at least one control area is located in an upper layer of the target video playback-area and configured to display at least one interaction control of the currently played video.

The first receiving module 502 is configured to receive a target slide operation acting on the video playback page.

The obstructing adjustment module 503 is configured to, in response to the target slide operation, control the target video playback-area to move along a sliding direction of the target slide operation and adjust a degree to which the at least one interaction control obstructs the target video playback-area.

According to the control display apparatus provided in the embodiment, the page display module displays the video playback page, where the target video playback-area of the currently played video is displayed in the video playback page, and the at least one control area for displaying the interaction control of the currently played video is displayed in the upper layer of the target video playback-area, the first receiving module receives the target slide operation acting on the video playback page, and in response to the target slide operation, the obstructing adjustment module controls the target video playback-area of the currently played video to move along the sliding direction of the target slide operation and adjusts the degree to which the interaction control displayed in the at least one control area obstructs the target video playback-area. In the embodiment, by use of the preceding technical schemes, the user can view the video playback-area obstructed by the interaction control through a simple slide operation so that operations required by the user for viewing the video playback-area obstructed by the interaction control can be simplified, improving the viewing efficiency of the user and the video viewing experience of the user.

In an embodiment, the obstructing adjustment module 503 may include a transparency adjustment unit, which is configured to control the at least one interaction control to move synchronously with the target video playback-area and adjust transparency of part or all of the at least one interaction control according to a movement distance of the at least one interaction control, where the transparency is positively correlated to the movement distance.

In an embodiment, the obstructing adjustment module 503 may include a hide adjustment unit, which is configured to adjust part or all of the at least one interaction control from a display state to a hidden state.

In the preceding schemes, the obstructing adjustment module 503 may include a first movement control unit or a second movement control unit. The first movement control unit is configured to control the at least one interaction control to move along the sliding direction of the target slide operation at a second movement speed different from a first movement speed of the target video playback-area. The second movement control unit is configured to control the at least one interaction control to move along the sliding direction of the target slide operation at different movement speeds in sequence.

In the preceding schemes, the second movement control unit may be configured to, when the target slide operation is a slide along an initial first direction, control the at least one interaction control to move along the first direction at the second movement speed, and when a target control area moves out of the target video playback-area, adjust a movement speed of the at least one interaction control from the second movement speed to the first movement speed.

In the preceding schemes, the second movement control unit may be further configured to, when a time length for which the at least one interaction control moves at the first movement speed reaches a first preset time length after the movement speed of the at least one interaction control is adjusted from the second movement speed to the first movement speed, adjust the movement speed of the at least one interaction control from the first movement speed to a third movement speed, where the first movement speed is between the second movement speed and the third movement speed in order of magnitude.

In an embodiment, the obstructing adjustment module 503 may further include a third movement control unit, which is configured to, when the sliding direction of the target slide operation is switched to a second direction opposite to the first direction, control the at least one interaction control to move along the second direction, where a switching order of movement speeds at which the at least one interaction control moves along the second direction is reverse to a switching order of movement speeds at which the at least one interaction control moves along the first direction.

In an embodiment, the control display apparatus provided in the embodiment may further include a distance acquisition module, a switching module, and a restoration module. The distance acquisition module is configured to, when the target slide operation ends, acquire a sliding distance of the target slide operation. The switching module is configured to, when the sliding distance is greater than or equal to a preset distance threshold, switch the video playback page currently displayed or switch the currently played video. The restoration module is configured to, when the sliding distance is less than the preset distance threshold, move the target video playback-area back to an original display position of the target video playback-area in the video playback page and switch a state of the at least one interaction control to an original state of the at least one interaction control in the video playback page.

In an embodiment, the obstructing adjustment module 503 may further include a page movement unit or a playback-area movement unit. The page movement unit is configured to control a page that is to be switched to corresponding to the target slide operation to move synchronously with the target video playback-area to display part of page content of the page that is to be switched to. The playback-area movement unit is configured to control a video playback-area that is to be switched to of a video that is to be switched to corresponding to the target slide operation to move synchronously with the target video playback-area to display part of a video playback-area of the video that is to be switched to in the video playback page.

In an embodiment, the control display apparatus provided in the embodiment may further include a second receiving module and a hide adjustment module. The second receiving module is configured to, after the video playback page is displayed, receive a long press operation acting on a target interaction control, where a time length of the long press operation is greater than or equal to a second preset time length. The hide adjustment module is configured to, in response to the long press operation, adjust the target interaction control from the display state to the hidden state.

The control display apparatus provided in the embodiment of the present disclosure may perform the control display method provided in any embodiment of the present disclosure and has corresponding function modules for performing the control display method. For technical details not described in detail in the embodiment, reference may be made to the control display method provided in any embodiment of the present disclosure.

Figure 6:
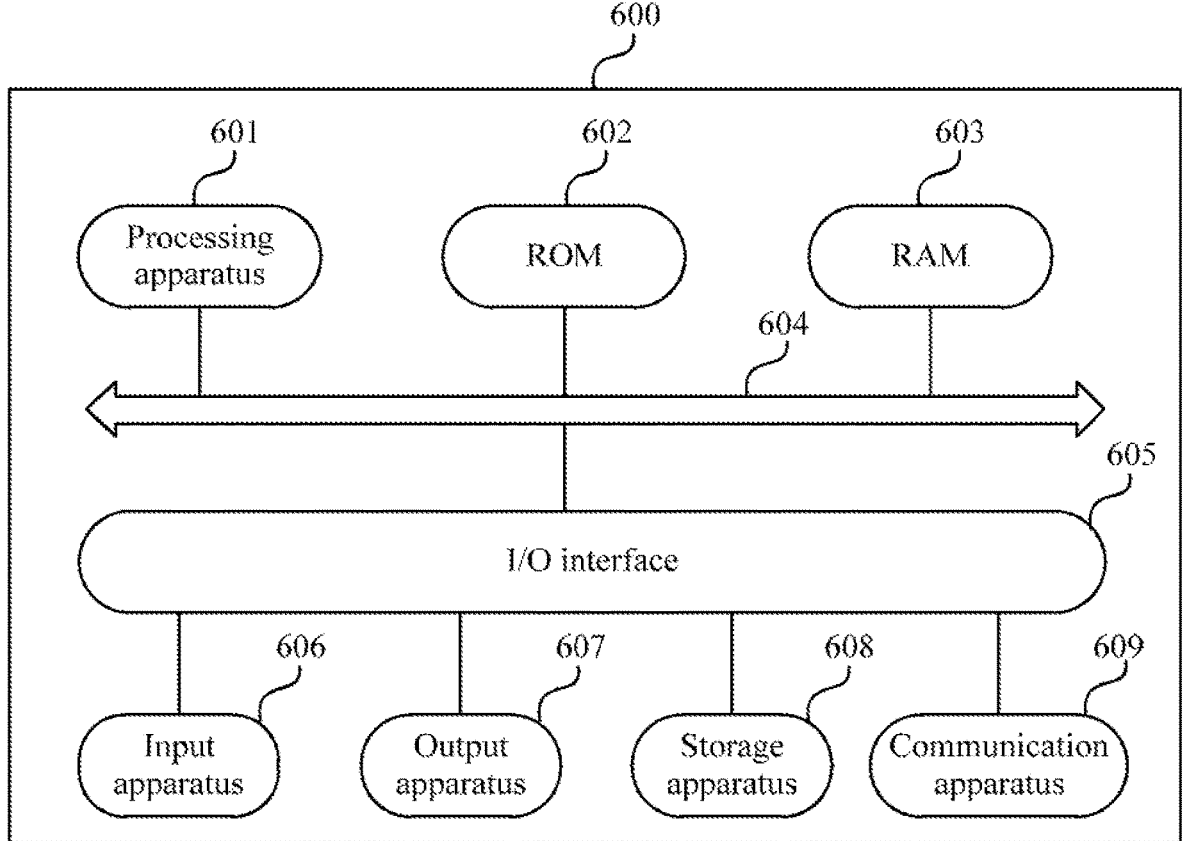
FIG. 6 is a structural diagram of an electronic device according to an embodiment of the present disclosure.

Referring to FIG. 6, FIG. 6 shows a structural diagram of an electronic device (such as a terminal device) 600 applicable to implementing embodiments of the present disclosure. The terminal device in the embodiments of the present disclosure may include, but is not limited to, mobile terminals such as a mobile phone, a laptop, a digital broadcast receiver, a personal digital assistant (PDA), a portable Android device (PAD), a portable media player (PMP), and an in-vehicle terminal (such as an in-vehicle navigation terminal) and stationary terminals such as a digital television (TV) and a desktop computer. The electronic device shown in FIG. 6 is merely an example and should not impose any limitation to the function and usage scope of the embodiments of the present disclosure.

As shown in FIG. 6, the electronic device 600 may include a processing apparatus (such as a central processing unit or a graphics processing unit) 601. The processing apparatus 601 may perform various proper actions and processing according to a program stored in a read-only memory (ROM) 602 or a program loaded into a random-access memory (RAM) 603 from a storage apparatus 608. Various programs and data required for operations of the electronic device 600 are also stored in the RAM 603. The processing apparatus 601, the ROM 602, and the RAM 603 are connected to each other via a bus 604. An input/output (I/O) interface 605 is also connected to the bus 604.

Generally, the following apparatuses may be connected to the I/O interface 605: an input apparatus 606 including, for example, a touchscreen, a touchpad, a keyboard, a mouse, a camera, a microphone, an accelerometer, and a gyroscope, an output apparatus 607 including, for example, a liquid crystal display (LCD), a speaker, and a vibrator, the storage apparatus 608 including, for example, a magnetic tape and a hard disk, and a communication apparatus 609. The communication apparatus 609 may allow the electronic device 600 to perform wireless or wired communication with other devices to exchange data. Although FIG. 6 shows the electronic device 600 having various apparatuses, it is to be understood that it is not required to implement or have all the shown apparatuses. Alternatively, more or fewer apparatuses may be implemented or present.

Particularly, according to the embodiments of the present disclosure, the process described above with reference to a flowchart may be implemented as a computer software program. For example, a computer program product is included in the embodiments of the present disclosure. The computer program product includes a computer program carried in a non-transitory computer-readable medium. The computer program includes program codes for executing the method shown in the flowchart. In such embodiments, the computer program may be downloaded and installed from a network through the communication apparatus 609, installed from the storage apparatus 608, or installed from the ROM 602. When the computer program is executed by the processing apparatus 601, the preceding functions defined in the methods in the embodiments of the present disclosure are implemented.

It is to be noted that the preceding computer-readable medium in the present disclosure may be a computer-readable signal medium or a computer-readable storage medium or any combination thereof. For example, the computer-readable storage medium may be, but is not limited to, an electrical, magnetic, optical, electromagnetic, infrared, or semiconductor system, apparatus, or device or any combination thereof. Concrete examples of the computer-readable storage medium may include, but are not limited to, an electrical connection having one or more wires, a portable computer disk, a hard disk, a random-access memory (RAM), a read-only memory (ROM), an erasable programmable read-only memory (EPROM) or a flash memory, an optical fiber, a portable compact disc read-only memory (CD-ROM), an optical memory device, a magnetic memory device, or any suitable combination thereof. In the present disclosure, the computer-readable storage medium may be any tangible medium including or storing a program. The program may be used by an instruction execution system, apparatus, or device or used in conjunction with an instruction execution system, apparatus, or device. In the present disclosure, the computer-readable signal medium may include a data signal propagated on a baseband or as a part of a carrier, and computer-readable program codes are carried in the data signal. The data signal propagated in this manner may be in multiple forms, including, but not limited to, an electromagnetic signal, an optical signal, or any suitable combination thereof. The computer-readable signal medium may also be any computer-readable medium except the computer-readable storage medium. The computer-readable signal medium may send, propagate, or transmit a program used by an instruction execution system, apparatus, or device or used in conjunction with an instruction execution system, apparatus, or device. The program codes included on the computer-readable medium may be transmitted by any suitable medium, including, but not limited to, a wire, an optical cable, a radio frequency (RF), or any suitable combination thereof.

In some embodiments, clients and servers may communicate by using any network protocol currently known or developed in the future, such as a Hypertext Transfer Protocol (HTTP) and may be interconnected to any form or medium of digital data communication (for example, a communication network). Examples of the communication network include a local area network (LAN), a wide area network (WAN), an inter-network (for example, the Internet), a peer-to-peer network (for example, an ad hoc network), and any network currently known or developed in the future.

The preceding computer-readable medium may be included in the preceding electronic device or may exist alone without being assembled into the electronic device.

The preceding computer-readable medium carries at least one program, where the at least one program, when executed by the electronic device, causes the electronic device to: display a video playback page, where a target video playback-area of a currently played video and at least one control area are displayed in the video playback page, and the at least one control area is located in an upper layer of the target video playback-area and configured to display at least one interaction control of the currently played video; receive a target slide operation acting on the video playback page; and in response to the target slide operation, control the target video playback-area to move along a sliding direction of the target slide operation and adjust a degree to which the at least one interaction control obstructs the target video playback-area.

Computer program codes for executing operations in the present disclosure may be written in one or more programming languages or a combination thereof. The preceding programming languages include, but are not limited to, object-oriented programming languages such as Java, Smalltalk, and C++ and may also include conventional procedural programming languages such as C or similar programming languages. Program codes may be executed entirely on a user computer, executed partly on a user computer, executed as a stand-alone software package, executed partly on a user computer and partly on a remote computer, or executed entirely on a remote computer or a server. In the case where the remote computer is involved, the remote computer may be connected to the user computer via any type of network including a local area network (LAN) or a wide area network (WAN) or may be connected to an external computer (for example, via the Internet through an Internet service provider).

Flowcharts and block diagrams among the drawings illustrate architectures, functions, and operations possible to implement in accordance with the system, method, and computer program product in various embodiments of the present disclosure. In this regard, each block in the flowcharts or block diagrams may represent a module, program segment, or part of codes, where the module, program segment, or part of codes includes at least one executable instruction for implementing specified logical functions. It is to be noted that in some alternative implementations, functions marked in blocks may occur in an order different from that marked in the drawings. For example, two successive blocks may, in fact, be executed substantially in parallel or in reverse order, which depends on the functions involved. It is also to be noted that each block in the block diagrams and/or flowcharts and a combination of blocks in the block diagrams and/or flowcharts may be implemented by a special-purpose hardware-based system executing a specified function or operation or may be implemented by a combination of special-purpose hardware and computer instructions.

The involved units described in the embodiments of the present disclosure may be implemented by software or hardware. The name of a module is not intended to limit the unit itself in some circumstances.

The functions described above herein may be at least partially implemented by at least one hardware logic component. For example, without limitation, example types of hardware logic components that can be used include a field-programmable gate array (FPGA), an application-specific integrated circuit (ASIC), an application-specific standard product (ASSP), a system-on-chip (SoC), a complex programmable logic device (CPLD), and the like.

In the context of the present disclosure, a machine-readable medium may be a tangible medium that may include or store a program used by an instruction execution system, apparatus, or device or used in conjunction with an instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device or any suitable combination thereof. Concrete examples of the machine-readable storage medium include an electrical connection based on at least one wire, a portable computer disk, a hard disk, a random-access memory (RAM), a read-only memory (ROM), an erasable programmable read-only memory (EPROM) or a flash memory, an optical fiber, a portable compact disc read-only memory (CD-ROM), an optical storage device, a magnetic storage device, or any suitable combination thereof.

According to at least one embodiment of the present disclosure, example 1 provides a control display method. The method includes the steps described below.

A video playback page is displayed, where a target video playback-area of a currently played video and at least one control area are displayed in the video playback page, and the at least one control area is located in an upper layer of the target video playback-area and configured to display at least one interaction control of the currently played video.

A target slide operation acting on the video playback page is received.

In response to the target slide operation, the target video playback-area is controlled to move along a sliding direction of the target slide operation and a degree to which the at least one interaction control obstructs the target video playback-area is adjusted.

According to at least one embodiment of the present disclosure, in example 2, according to the method of example 1, the step in which the degree to which the at least one interaction control obstructs the target video playback-area is adjusted includes the step described below.

The at least one interaction control is controlled to move synchronously with the target video playback-area and transparency of part or all of the at least one interaction control is adjusted according to a movement distance of the at least one interaction control, where the transparency is positively correlated to the movement distance.

According to at least one embodiment of the present disclosure, in example 3, according to the method of example 1, the step in which the degree to which the at least one interaction control obstructs the target video playback-area is adjusted includes the step described below.

Part or all of the at least one interaction control is adjusted from a display state to a hidden state.

According to at least one embodiment of the present disclosure, in example 4, according to the method of example 1, the step in which the degree to which the at least one interaction control obstructs the target video playback-area is adjusted includes the step described below.

The at least one interaction control is controlled to move along the sliding direction of the target slide operation at a second movement speed different from a first movement speed of the target video playback-area; or the at least one interaction control is controlled to move along the sliding direction of the target slide operation at different movement speeds in sequence.

According to at least one embodiment of the present disclosure, in example 5, according to the method of example 4, the step in which the at least one interaction control is controlled to move along the sliding direction of the target slide operation at different movement speeds in sequence includes the steps described below.

When the target slide operation is a slide along an initial first direction, the at least one interaction control is controlled to move along the first direction at the second movement speed.

When a target control area moves out of the target video playback-area, a movement speed of the at least one interaction control is adjusted from the second movement speed to the first movement speed.

According to at least one embodiment of the present disclosure, in example 6, according to the method of example 5, after the movement speed of the at least one interaction control is adjusted from the second movement speed to the first movement speed, the method further includes the step described below.

When a time length for which the at least one interaction control moves at the first movement speed reaches a first preset time length, the movement speed of the at least one interaction control is adjusted from the first movement speed to a third movement speed, where the first movement speed is between the second movement speed and the third movement speed in order of magnitude.

According to at least one embodiment of the present disclosure, in example 7, according to the method of example 5 or 6, the method further includes the step described below.

When the sliding direction of the target slide operation is switched to a second direction opposite to the first direction, the at least one interaction control is controlled to move along the second direction, where a switching order of movement speeds at which the at least one interaction control moves along the second direction is reverse to a switching order of movement speeds at which the at least one interaction control moves along the first direction.

According to at least one embodiment of the present disclosure, in example 8, according to the method of any one of examples 1 to 6, the method further includes the steps described below.

When the target slide operation ends, a sliding distance of the target slide operation is acquired.

In the case where the sliding distance is greater than or equal to a preset distance threshold, the video playback page currently displayed is switched or the currently played video is switched.

In the case where the sliding distance is less than the preset distance threshold, the target video playback-area is moved back to an original display position of the target video playback-area in the video playback page and a state of the at least one interaction control is switched to an original state of the at least one interaction control in the video playback page.

According to at least one embodiment of the present disclosure, in example 9, according to the method of any one of examples 1 to 6, the method further includes the step described below.

A page that is to be switched to corresponding to the target slide operation is controlled to move synchronously with the target video playback-area, so as to display part of page content of the page that is to be switched to; or a video playback-area that is to be switched to of a video that is to be switched to corresponding to the target slide operation is controlled to move synchronously with the target video playback-area, so as to display part of a video playback-area of the video that is to be switched to in the video playback page.

According to at least one embodiment of the present disclosure, in example 10, according to the method of any one of examples 1 to 6, the method further includes the steps described below.

A long press operation acting on a target interaction control is received, where a time length of the long press operation is greater than or equal to a second preset time length.

In response to the long press operation, the target interaction control is adjusted from a display state to a hidden state.

According to at least one embodiment of the present disclosure, example 11 provides a control display apparatus including a page display module, a first receiving module, and an obstructing adjustment module.

The page display module is configured to display a video playback page, where a target video playback-area of a currently played video and at least one control area are displayed in the video playback page, and the at least one control area is located in an upper layer of the target video playback-area and configured to display at least one interaction control of the currently played video.

The first receiving module is configured to receive a target slide operation acting on the video playback page.

The obstructing adjustment module is configured to, in response to the target slide operation, control the target video playback-area to move along a sliding direction of the target slide operation and adjust a degree to which the at least one interaction control obstructs the target video playback-area.

According to at least one embodiment of the present disclosure, example 12 provides an electronic device including at least one processor and a memory.

The memory is configured to store at least one program.

The at least one program, when executed by the at least one processor, causes the at least one processor to perform the control display method of any one of examples 1 to 10.

According to at least one embodiment of the present disclosure, example 13 provides a computer-readable storage medium on which a computer program is stored, where the computer program, when executed by a processor, implements the control display method of any one of examples 1 to 10.

The preceding description is merely illustrative of embodiments of the present disclosure and the technical principles used therein. It is to be understood by those skilled in the art that the scope of disclosure involved in the present disclosure is not limited to the technical solutions formed by particular combinations of the preceding technical features and should also cover other technical solutions formed by any combinations of the preceding technical features or their equivalents without departing from the concept of the present disclosure, for example, technical solutions formed by the substitutions of the preceding features with the technical features (not limited to being) disclosed in the present disclosure and having similar functions.

Additionally, although operations are depicted in a particular order, this should not be construed as that these operations are required to be performed in the particular order shown or in a sequential order. In certain circumstances, multitasking and parallel processing may be advantageous. Similarly, although several specific implementation details are included in the preceding discussion, these should not be construed as limiting the scope of the present disclosure. Some features described in the context of separate embodiments may also be implemented in combination in a single embodiment. Conversely, various features described in the context of a single embodiment may also be implemented in multiple embodiments individually or in any suitable sub-combination.

Although the subject matter has been described in a language specific to structural features and/or methodological logic acts, it is to be understood that the subject matter defined in the appended claims is not necessarily limited to the particular features or acts described above. Conversely, the particular features and acts described above are merely example forms for implementing the claims.

23

What is claimed is:

1. A control display method, comprising:

displaying a video playback page, wherein a target video playback-area of a currently played video and at least one control area are displayed in the video playback page, and the at least one control area is located in an upper layer of the target video playback-area and configured to display at least one interaction control of the currently played video;

receiving a target slide operation acting on the video playback page; and in response to the target slide operation, controlling the target video playback-area to move along a sliding direction of the target slide operation and adjusting a degree to which the at least one interaction control obstructs the target video playback-area;

wherein adjusting the degree to which the at least one interaction control obstructs the target video playback-area comprises:

adjusting transparency of the at least one interaction control relative to transparency of the target video playback-area; and adjusting a movement speed of the at least one interaction control; and wherein adjusting the movement speed of the at least one interaction control comprises:

controlling the at least one interaction control to move synchronously with the target video playback-area along the sliding direction of the target slide operation at a second movement speed different from a first movement speed of the target video playback-area.

2. The method of claim 1, wherein adjusting the transparency of the at least one interaction control relative to the transparency of the target video playback-area comprises:

controlling the at least one interaction control to move synchronously with the target video playback-area and adjusting transparency of part or all of the at least one interaction control according to a movement distance of the at least one interaction control, wherein the transparency is positively correlated to the movement distance.

3. The method of claim 1, wherein adjusting the degree to which the at least one interaction control obstructs the target video playback-area further comprises:

adjusting display state of the at least one interaction control; and wherein adjusting the display state of the at least one interaction control comprises:

adjusting part or all of the at least one interaction control from a display state to a hidden state.

4. The method of claim 1, wherein adjusting the movement speed of the at least one interaction control further comprises:

controlling the at least one interaction control to move along the sliding direction of the target slide operation at different movement speeds in sequence.

5. The method of claim 4, wherein controlling the at least one interaction control to move along the sliding direction of the target slide operation at different movement speeds in sequence comprises:

in response to determining that the target slide operation is a slide along an initial first direction, controlling the at least one interaction control to move along the first direction at the second movement speed; and in response to a target control area moving out of the target video playback-area, adjusting a movement speed of the at least one interaction control from the second movement speed to the first movement speed.

6. The method of claim 5, after adjusting the movement speed of the at least one interaction control from the second movement speed to the first movement speed, further comprising:

in response to a time length for which the at least one interaction control moves at the first movement speed reaching a first preset time length, adjusting the movement speed of the at least one interaction control from the first movement speed to a third movement speed, wherein the first movement speed is between the second movement speed and the third movement speed in order of magnitude.

7. The method of claim 5, further comprising:

in response to the sliding direction of the target slide operation being switched to a second direction opposite to the first direction, controlling the at least one interaction control to move along the second direction, wherein a switching order of movement speeds at which the at least one interaction control moves along the second direction is reverse to a switching order of movement speeds at which the at least one interaction control moves along the first direction.

8. The method of claim 1, further comprising:

controlling a page that is to be switched to corresponding to the target slide operation to move synchronously with the target video playback-area to display part of page content of the page that is to be switched to; or controlling a video playback-area that is to be switched to of a video that is to be switched to corresponding to the target slide operation to move synchronously with the target video playback-area to display part of a video playback-area of the video that is to be switched to in the video playback page.

9. The method of claim 1, after displaying the video playback page, further comprising:

receiving a long press operation acting on a target interaction control, wherein a time length of the long press operation is greater than or equal to a second preset time length; and in response to the long press operation, adjusting the target interaction control from a display state to a hidden state.

10. An electronic device, comprising:

at least one processor; and a memory, which is configured to store at least one program;

wherein the at least one program, when executed by the at least one processor, causes the at least one processor to perform:

displaying a video playback page, wherein a target video playback-area of a currently played video and at least one control area are displayed in the video playback page, and the at least one control area is located in an upper layer of the target video playback-area and configured to display at least one interaction control of the currently played video;

receiving a target slide operation acting on the video playback page; and in response to the target slide operation, controlling the target video playback-area to move along a sliding direction of the target slide operation and adjusting a degree to which the at least one interaction control obstructs the target video playback-area;

wherein adjusting the degree to which the at least one interaction control obstructs the target video playback-area comprises:

adjusting transparency of the at least one interaction control relative to transparency of the target video playback-area; and adjusting a movement speed of the at least one interaction control; and wherein adjusting the movement speed of the at least one interaction control comprises:

controlling the at least one interaction control to move synchronously with the target video playback-area along the sliding direction of the target slide operation at a second movement speed different from a first movement speed of the target video playback-area.

11. The electronic device of claim 10, wherein the at least one program, when executed by the at least one processor, causes the at least one processor to perform adjusting the transparency of the at least one interaction control relative to the transparency of the target video playback-area in the following way:

controlling the at least one interaction control to move synchronously with the target video playback-area and adjusting transparency of part or all of the at least one interaction control according to a movement distance of the at least one interaction control, wherein the transparency is positively correlated to the movement distance.

12. The electronic device of claim 10, wherein the at least one program, when executed by the at least one processor, causes the at least one processor to perform adjusting the degree to which the at least one interaction control obstructs the target video playback-area the following way:

adjusting display state of the at least one interaction control; and wherein adjusting the display state of the at least one interaction control comprises:

adjusting part or all of the at least one interaction control from a display state to a hidden state.

13. The electronic device of claim 10, wherein adjusting the movement speed of the at least one interaction control further comprises:

controlling the at least one interaction control to move along the sliding direction of the target slide operation at different movement speeds in sequence.

14. The electronic device of claim 13, wherein the at least one program, when executed by the at least one processor, causes the at least one processor to perform controlling the at least one interaction control to move along the sliding direction of the target slide operation at different movement speeds in sequence in the following way:

in response to determining that the target slide operation is a slide along an initial first direction, controlling the at least one interaction control to move along the first direction at the second movement speed; and in response to a target control area moving out of the target video playback-area, adjusting a movement speed of the at least one interaction control from the second movement speed to the first movement speed.

15. The electronic device of claim 14, wherein the at least one program, when executed by the at least one processor, causes the at least one processor to, after adjusting the movement speed of the at least one interaction control from the second movement speed to the first movement speed, further perform:

in response to a time length for which the at least one interaction control moves at the first movement speed reaching a first preset time length, adjusting the movement speed of the at least one interaction control from the first movement speed to a third movement speed, wherein the first movement speed is between the second movement speed and the third movement speed in order of magnitude.

16. The electronic device of claim 14, wherein the at least one program, when executed by the at least one processor, causes the at least one processor to further perform:

in response to the sliding direction of the target slide operation being switched to a second direction opposite to the first direction, controlling the at least one interaction control to move along the second direction, wherein a switching order of movement speeds at which the at least one interaction control moves along the second direction is reverse to a switching order of movement speeds at which the at least one interaction control moves along the first direction.

17. The electronic device of claim 10, wherein the at least one program, when executed by the at least one processor, causes the at least one processor to further perform:

controlling a page that is to be switched to corresponding to the target slide operation to move synchronously with the target video playback-area to display part of page content of the page that is to be switched to; or controlling a video playback-area that is to be switched to of a video that is to be switched to corresponding to the target slide operation to move synchronously with the target video playback-area to display part of a video playback-area of the video that is to be switched to in the video playback page.

18. A non-transitory computer-readable storage medium on which a computer program is stored, wherein the computer program, when executed by a processor, implements:

displaying a video playback page, wherein a target video playback-area of a currently played video and at least one control area are displayed in the video playback page, and the at least one control area is located in an upper layer of the target video playback-area and configured to display at least one interaction control of the currently played video;

receiving a target slide operation acting on the video playback page; and in response to the target slide operation, controlling the target video playback-area to move along a sliding direction of the target slide operation and adjusting a degree to which the at least one interaction control obstructs the target video playback-area;

wherein adjusting the degree to which the at least one interaction control obstructs the target video playback-area comprises:

adjusting transparency of the at least one interaction control relative to transparency of the target video playback-area; and adjusting a movement speed of the at least one interaction control; and wherein adjusting the movement speed of the at least one interaction control comprises:

controlling the at least one interaction control to move synchronously with the target video playback-area along the sliding direction of the target slide operation at a second movement speed different from a first movement speed of the target video playback-area.

19. The method of claim 1, further comprising:

in response to an end of the target slide operation, acquiring a sliding distance of the target slide operation;

in response to determining that the sliding distance is greater than or equal to a preset distance threshold, switching the video playback page currently displayed or switching the currently played video; and in response to determining that the sliding distance is less than the preset distance threshold, moving the target video playback-area back to an original display position in the video playback page and switching the degree of the at least one interaction control back to an original degree of the at least one interaction control in the video playback page.

20. The electronic device of claim 10, wherein the at least one program, when executed by the at least one processor, causes the at least one processor to further perform:

in response to an end of the target slide operation, acquiring a sliding distance of the target slide operation;

in response to determining that the sliding distance is greater than or equal to a preset distance threshold, switching the video playback page currently displayed or switching the currently played video; and in response to determining that the sliding distance is less than the preset distance threshold, moving the target video playback-area back to an original display position in the video playback page and switching the degree of the at least one interaction control back to an original degree of the at least one interaction control in the video playback page.

* * * * *